US007759292B2

(12) United States Patent
Eoff et al.

(10) Patent No.: US 7,759,292 B2
(45) Date of Patent: *Jul. 20, 2010

(54) METHODS AND COMPOSITIONS FOR REDUCING THE PRODUCTION OF WATER AND STIMULATING HYDROCARBON PRODUCTION FROM A SUBTERRANEAN FORMATION

(75) Inventors: Larry S. Eoff, Duncan, OK (US); Eldon D. Dalrymple, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/760,443

(22) Filed: Jan. 20, 2004

(65) Prior Publication Data
US 2004/0229757 A1 Nov. 18, 2004

Related U.S. Application Data

(63) Continuation-in-part of application No. 10/440,337, filed on May 16, 2003, now abandoned, and a continuation-in-part of application No. 10/612,271, filed on Jul. 2, 2003, now Pat. No. 7,182,136.

(51) Int. Cl.
*C09K 8/588* (2006.01)
*C09K 8/88* (2006.01)
*C09K 8/90* (2006.01)

(52) U.S. Cl. .............. 507/212; 507/214; 507/222; 507/244; 507/246; 507/259; 507/261; 166/305.1; 166/306

(58) Field of Classification Search ............ 507/119, 507/120, 110
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,687,375 A | 8/1954 | Fischer et al. | |
| 2,689,244 A | 9/1954 | Jones | |
| 2,819,278 A | 1/1958 | De Groots et al. | |
| 2,843,573 A | 7/1958 | Melamed | 526/260 |
| 2,863,832 A | 12/1958 | Perrine | 507/267 |
| 2,877,179 A | 3/1959 | Hughes et al. | |
| 2,910,436 A | 10/1959 | Alhambra et al. | 166/307 |
| 3,008,898 A | 11/1961 | Hughes et al. | |
| 3,052,298 A | 9/1962 | Mallot | |
| 3,065,247 A | 11/1962 | De Groots et al. | |
| 3,138,205 A | 6/1964 | Kerver et al. | |
| 3,215,199 A | 11/1965 | Dilgren | 166/250.01 |
| 3,251,415 A | 5/1966 | Bombardier et al. | 166/42 |
| 3,271,307 A | 9/1966 | Dickson et al. | 300/152 |
| 3,297,090 A | 1/1967 | Dilgren | 166/300 |
| 3,307,630 A | 3/1967 | Dilgren et al. | 166/38 |
| 3,326,890 A | 6/1967 | Engelskirchen et al. | |
| 3,336,980 A | 8/1967 | Rike | |
| 3,382,924 A | 5/1968 | Veley et al. | 166/42 |
| 3,404,114 A | 10/1968 | Walter et al. | 524/812 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A | 1/1970 | Millhone et al. | |
| 3,601,194 A | 8/1971 | Gallus | |
| 3,615,794 A | 10/1971 | Nimerick | |
| 3,637,656 A | 1/1972 | Geronimo et al. | |
| 3,647,507 A | 3/1972 | Ashcraft | |
| 3,647,567 A | 3/1972 | Schweri et al. | 428/463 |

(Continued)

FOREIGN PATENT DOCUMENTS

DE 2 250 552 4/1974

(Continued)

OTHER PUBLICATIONS

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

(Continued)

*Primary Examiner*—James Seidleck
*Assistant Examiner*—John J Figueroa
(74) *Attorney, Agent, or Firm*—Robert A. Kent

(57) ABSTRACT

The present invention relates to subterranean treatment fluids, and more particularly, the present invention relates to subterranean treatment fluids comprising relative permeability modifiers and methods for using such subterranean treatment fluids in subterranean operations to reduce the production of water from and stimulate hydrocarbon production in a subterranean formation. In certain embodiments, the methods of the present invention generally comprise the steps of providing a permeability-modifying aqueous treatment fluid comprising a relative permeability modifier and contacting a subterranean formation with the permeability-modifying aqueous treatment fluid. Optionally, the permeability-modifying aqueous treatment fluid may be injected in the subterranean formation at a pressure sufficient to create or enhance at least one fracture therein. In another embodiment, the methods of the present invention further comprise the step of injecting an acidizing treatment into the subterranean formation. In another embodiment, the relative permeability modifier may be provided by appropriate reaction in situ.

29 Claims, No Drawings

U.S. PATENT DOCUMENTS

| | | | |
|---|---|---|---|
| 3,689,418 A | 9/1972 | Cenci et al. | |
| 3,689,468 A | 9/1972 | Cenci et al. | 526/312 |
| 3,708,013 A | 1/1973 | Dismukes | |
| 3,709,298 A | 1/1973 | Pramann | |
| 3,744,566 A | 7/1973 | Szabo et al. | 166/275 |
| 3,902,557 A | 9/1975 | Shaughnessy et al. | |
| 3,910,862 A | 10/1975 | Barabas et al. | 260/79.3 MU |
| 3,943,060 A | 3/1976 | Martin et al. | |
| 3,983,941 A | 10/1976 | Fitch | |
| 4,029,544 A | 6/1977 | Jarowenko et al. | |
| 4,052,343 A | 10/1977 | Cunningham | 521/32 |
| 4,052,345 A | 10/1977 | Austin et al. | |
| 4,129,183 A | 12/1978 | Kalfoglou | 166/300 |
| 4,129,534 A | 12/1978 | Cunningham | 521/38 |
| 4,142,595 A | 3/1979 | Anderson et al. | 175/72 |
| 4,152,274 A | 5/1979 | Phillips et al. | 876/296 |
| 4,158,521 A | 6/1979 | Anderson et al. | 405/264 |
| 4,158,726 A | 6/1979 | Kamada et al. | 526/200 |
| 4,228,277 A | 10/1980 | Landoll | |
| 4,299,710 A | 11/1981 | Dupre et al. | 252/8.5 A |
| 4,306,981 A * | 12/1981 | Blair, Jr. | 507/220 |
| 4,337,828 A * | 7/1982 | Blair, Jr. | 166/400 |
| 4,366,071 A | 12/1982 | McLaughlin et al. | 252/8.55 R |
| 4,366,072 A | 12/1982 | McLaughlin et al. | 252/8.55 R |
| 4,366,073 A | 12/1982 | McLaughlin et al. | 252/8.55 R |
| 4,366,074 A | 12/1982 | McLaughlin et al. | 252/8.55 R |
| 4,374,739 A | 2/1983 | McLaughlin et al. | 252/8.55 R |
| 4,393,939 A | 7/1983 | Smith et al. | 166/293 |
| 4,395,340 A | 7/1983 | McLaughlin | 252/8.55 D |
| 4,401,789 A | 8/1983 | Gideon | 524/827 |
| 4,409,110 A | 10/1983 | Borchardt et al. | |
| 4,439,334 A | 3/1984 | Borchardt | 252/8.55 D |
| 4,440,649 A | 4/1984 | Loftin et al. | 252/8.5 C |
| 4,441,556 A | 4/1984 | Powers et al. | |
| 4,447,342 A | 5/1984 | Borchardt et al. | 252/8.55 D |
| 4,460,627 A | 7/1984 | Weaver et al. | 427/212 |
| 4,462,718 A | 7/1984 | McLaughlin et al. | 405/264 |
| 4,499,214 A | 2/1985 | Sortwell | |
| 4,532,052 A | 7/1985 | Weaver et al. | 252/8.55 |
| 4,536,297 A | 8/1985 | Loftin et al. | 252/8.5 C |
| 4,536,303 A | 8/1985 | Borchardt | 252/8.55 R |
| 4,536,305 A | 8/1985 | Borchardt et al. | 252/8.55 R |
| 4,552,670 A | 11/1985 | Lipowski et al. | 704/553 |
| 4,554,081 A | 11/1985 | Borchardt et al. | 252/8.5 A |
| 4,563,292 A | 1/1986 | Borchardt | 252/8.55 R |
| 4,604,216 A | 8/1986 | Irvin et al. | 252/8.51 |
| 4,608,139 A | 8/1986 | Craun et al. | 428/457 |
| 4,619,776 A | 10/1986 | Mondshine | |
| 4,627,926 A | 12/1986 | Peiffer et al. | 252/8.55 R |
| 4,631,138 A | 12/1986 | Johns et al. | |
| 4,662,448 A | 5/1987 | Ashford et al. | |
| 4,671,883 A | 6/1987 | Connell | 252/8.515 |
| 4,693,639 A | 9/1987 | Hollenbeak et al. | 405/263 |
| 4,699,722 A | 10/1987 | Dymond et al. | 252/8.551 |
| 4,702,319 A | 10/1987 | Bock et al. | |
| 4,730,028 A | 3/1988 | Bock et al. | 526/225 |
| 4,814,096 A | 3/1989 | Evani | 252/8.554 |
| 4,828,725 A | 5/1989 | Lai et al. | |
| 4,828,726 A | 5/1989 | Himes et al. | 252/8.553 |
| 4,856,590 A | 8/1989 | Caillier | |
| 4,870,167 A | 9/1989 | Zody et al. | |
| 4,941,537 A | 7/1990 | Langemeier et al. | |
| 4,956,104 A * | 9/1990 | Cowan et al. | 507/211 |
| 4,959,432 A | 9/1990 | Fan et al. | 526/287 |
| 4,960,876 A | 10/1990 | Molteni et al. | |
| 4,993,448 A | 2/1991 | Karydas et al. | |
| 5,051,197 A | 9/1991 | Kalfayan et al. | |
| 5,071,934 A | 12/1991 | Peiffer | 526/307 |
| 5,097,904 A | 3/1992 | Himes | 166/294 |
| 5,105,886 A | 4/1992 | Strubhar et al. | |
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,248,665 A * | 9/1993 | Hale et al. | 507/136 |
| 5,256,651 A | 10/1993 | Phelps et al. | |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,407,909 A | 4/1995 | Goodhue, Jr. et al. | |
| 5,424,284 A | 6/1995 | Patel et al. | |
| 5,445,223 A | 8/1995 | Nelson et al. | |
| 5,473,059 A * | 12/1995 | Yeh | 536/18.7 |
| 5,597,783 A | 1/1997 | Audibert et al. | |
| 5,607,902 A | 3/1997 | Smith et al. | 507/120 |
| 5,637,556 A | 6/1997 | Argillier et al. | |
| 5,643,460 A | 7/1997 | Marble et al. | |
| 5,646,093 A | 7/1997 | Dino | 507/209 |
| 5,663,123 A | 9/1997 | Goodhue, Jr. et al. | |
| 5,669,456 A | 9/1997 | Audibert et al. | 175/72 |
| 5,681,796 A | 10/1997 | Nimerick | |
| 5,704,426 A | 1/1998 | Rytlewski et al. | |
| 5,720,347 A | 2/1998 | Audibert et al. | |
| 5,728,653 A | 3/1998 | Audibert et al. | 507/222 |
| 5,735,349 A | 4/1998 | Dawson et al. | 166/295 |
| 5,887,653 A | 3/1999 | Bishop et al. | 166/281 |
| 5,908,814 A | 6/1999 | Patel et al. | |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 5,990,052 A | 11/1999 | Harris | |
| 6,020,289 A | 2/2000 | Dymond | 507/120 |
| 6,047,773 A | 4/2000 | Zeltmann et al. | |
| 6,070,664 A | 6/2000 | Dalrymple et al. | 166/281 |
| 6,124,245 A | 9/2000 | Patel | 507/120 |
| 6,187,839 B1 | 2/2001 | Eoff et al. | 523/130 |
| 6,194,356 B1 * | 2/2001 | Jones et al. | 507/225 |
| 6,209,646 B1 | 4/2001 | Reddy et al. | |
| 6,228,812 B1 | 5/2001 | Dawson et al. | 507/221 |
| 6,237,687 B1 | 5/2001 | Barbee, Jr. et al. | 166/278 |
| 6,242,390 B1 | 6/2001 | Mitchell et al. | |
| 6,248,697 B1 | 6/2001 | Goodhue, Jr. et al. | |
| 6,253,851 B1 | 7/2001 | Schroeder, Jr. et al. | 166/278 |
| 6,277,900 B1 | 8/2001 | Oswald et al. | 523/130 |
| 6,281,172 B1 | 8/2001 | Warren et al. | |
| 6,283,210 B1 | 9/2001 | Soliman et al. | 166/270 |
| 6,291,404 B2 | 9/2001 | House | |
| 6,358,889 B2 * | 3/2002 | Waggenspack et al. | 507/110 |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,454,003 B1 | 9/2002 | Chang et al. | |
| 6,476,169 B1 | 11/2002 | Eoff et al. | 523/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,520,255 B2 | 2/2003 | Tolman et al. | |
| 6,562,762 B2 | 5/2003 | Cowan et al. | |
| 6,569,983 B1 | 5/2003 | Treybig et al. | 528/102 |
| 6,601,648 B2 | 8/2003 | Ebinger | |
| 6,607,035 B1 | 8/2003 | Reddy et al. | |
| 6,609,578 B2 | 8/2003 | Patel et al. | 175/64 |
| 6,626,241 B2 | 9/2003 | Nguyen | |
| 6,627,719 B2 | 9/2003 | Whipple et al. | 774/325 |
| 6,637,517 B2 | 10/2003 | Qu et al. | |
| 6,656,885 B2 | 12/2003 | House et al. | |
| 6,662,874 B2 | 12/2003 | Surjaatmadja et al. | |
| 6,702,044 B2 | 3/2004 | Reddy et al. | |
| 6,710,107 B2 | 3/2004 | Audibert et al. | 524/5 |
| 6,723,683 B2 | 4/2004 | Crossman et al. | |
| 6,743,288 B2 | 6/2004 | Eoff et al. | |
| 6,764,981 B1 | 7/2004 | Eoff et al. | |

| | | |
|---|---|---|
| 6,767,867 B2 | 7/2004 | Chatterji et al. |
| 6,767,869 B2 | 7/2004 | DiLullo et al. |
| 6,780,822 B2 | 8/2004 | Cowan et al. |
| 6,787,506 B2 | 9/2004 | Blair et al. ............... 507/222 |
| 6,790,812 B2 * | 9/2004 | Halliday et al. ............ 507/269 |
| 6,800,593 B2 | 10/2004 | Dobson, Jr. et al. |
| 6,803,348 B2 | 10/2004 | Jones et al. ............... 507/221 |
| 6,846,420 B2 | 1/2005 | Reddy et al. |
| 6,855,672 B2 | 2/2005 | Poelker .................... 507/225 |
| 6,884,760 B1 | 4/2005 | Brand et al. |
| 6,962,203 B2 | 11/2005 | Funchess |
| 6,978,836 B2 | 12/2005 | Nguyen et al. |
| 6,981,552 B2 | 1/2006 | Reddy et al. |
| 7,007,752 B2 | 3/2006 | Reddy et al. |
| 7,008,908 B2 | 3/2006 | Chan et al. |
| 7,036,587 B2 | 5/2006 | Munoz, Jr. et al. |
| 7,036,589 B2 | 5/2006 | Nguyen |
| 7,081,439 B2 | 7/2006 | Sullivan et al. |
| 7,087,554 B2 | 8/2006 | Youngson et al. |
| 7,091,159 B2 | 8/2006 | Eoff et al. |
| 7,178,610 B2 | 2/2007 | Bell |
| 7,182,136 B2 | 2/2007 | Dalrymple et al. |
| 7,220,708 B2 | 5/2007 | Zamora et al. |
| 7,398,825 B2 | 7/2008 | Nguyen et al. |
| 7,427,583 B2 | 9/2008 | Couillet et al. |
| 2002/0123433 A1 | 9/2002 | Goodhue, Jr. et al. |
| 2003/0013871 A1 | 1/2003 | Mallon et al. |
| 2003/0019627 A1 | 1/2003 | Qu et al. .................. 166/281 |
| 2003/0104948 A1 | 6/2003 | Poelker et al. ............. 507/100 |
| 2003/0114317 A1 | 6/2003 | Benton et al. |
| 2003/0191030 A1 | 10/2003 | Blair et al. ............... 507/225 |
| 2004/0045712 A1 | 3/2004 | Eoff et al. ................. 166/293 |
| 2004/0102331 A1 | 5/2004 | Chan et al. ............... 507/100 |
| 2004/0171495 A1 | 9/2004 | Zamora et al. ............. 507/100 |
| 2004/0220058 A1 | 11/2004 | Eoff et al. ................. 507/200 |
| 2004/0229756 A1 | 11/2004 | Eoff et al. ................. 507/219 |
| 2005/0000694 A1 | 1/2005 | Dalrymple et al. .......... 166/307 |
| 2005/0155796 A1 | 7/2005 | Eoff et al. |
| 2005/0164894 A1 | 7/2005 | Eoff et al. |
| 2005/0178549 A1 | 8/2005 | Eoff et al. |
| 2005/0194140 A1 | 9/2005 | Dalrymple et al. |
| 2005/0199396 A1 | 9/2005 | Sierra et al. |
| 2005/0230114 A1 | 10/2005 | Eoff et al. |
| 2005/0230116 A1 | 10/2005 | Eoff et al. |
| 2005/0279502 A1 | 12/2005 | Eoff et al. |
| 2005/0284632 A1 | 12/2005 | Dalrymple et al. |
| 2006/0124309 A1 | 6/2006 | Nguyen et al. |
| 2006/0137875 A1 | 6/2006 | Dusterhoft et al. |
| 2006/0234874 A1 | 10/2006 | Eoff et al. |
| 2006/0240994 A1 | 10/2006 | Eoff et al. |
| 2006/0266522 A1 | 11/2006 | Eoff et al. |
| 2006/0283592 A1 | 12/2006 | Sierra et al. |
| 2007/0012445 A1 | 1/2007 | Nguyen et al. |
| 2008/0070805 A1 | 3/2008 | Munoz et al. |
| 2008/0070807 A1 | 3/2008 | Munoz et al. |
| 2008/0070808 A1 | 3/2008 | Munoz et al. |
| 2008/0110624 A1 | 5/2008 | Nguyen et al. |
| 2008/0139411 A1 | 6/2008 | Harris et al. |
| 2008/0173448 A1 | 7/2008 | Nguyen et al. |
| 2008/0196897 A1 | 8/2008 | Nguyen |
| 2009/0291863 A1 | 11/2009 | Welton |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 00/78890 A1 | 12/2000 |
| WO | WO 02/097236 | 12/2002 |
| WO | WO 03/056130 A1 | 7/2003 |
| WO | WO 2004/022667 A1 | 7/2003 |
| WO | WO 2004/094781 A1 | 4/2004 |
| WO | WO 2004/101706 A1 | 11/2004 |

OTHER PUBLICATIONS

Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).

Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).

U.S. Appl. No. 10/236,722, filed Sep. 6, 2002, Eoff et al.

U.S. Appl. No. 10/375,787, filed Feb. 27, 2003, Eoff et al.

Inikori, Solomon Ovueferaye, "Numerical Study of Water Coning Control with Downhole Water Sink (DWS) Well Completions in Vertical and Horizontal Wells," A Dissertation, Aug. 2002, title page, contents, abstract and pp. 17-18, The Department of Petroleum Engineering.

Halliburton, 2001 Press Release, "First Halliburton H2Zero™ Conformance Solution Job Performed for a Producing Well in Egypt," www.halliburton.com/news/archives/2001esgnws_111901.jsp, Nov. 19, 2001, 2 pp.

Halliburton, 2001 Press Release, "Halliburton Performs First H2Zero™ Conformance Solution Job in North America," www.halliburton.com/news/archives/2001_esgnws_082201.jsp, Aug. 22, 2001, 2 pp.

Halliburton, 2001 Press Release, "Halliburton Technology Uses Revolutionary Polymer system to Control Unwanted Water Production," www.halliburton.com/news/archives/2001esgnws_053101.jsp, May 31, 2001, 2 pp.

BJ Services Company, Aquacon, Aug. 1, 2001, 2 pp.

BJ Services Company, Aquatrol 1, Dec. 14, 2000, 2 pp.

Eoff, Larry et al., "Structure and Process Optimization for the Use of a Polymeric Relative-Permeability Modifier in Conformance Control," SPE eLibrary paper No. 64985, 2001 Copyright, 2 pp.

Botermans, C. Wouter et al. "Relative Permeability Modifiers: Myth or Reality?" SPE eLibrary paper No. 68973, 2001 copyright, 2 pp.

Office action dated Dec. 28, 2007 from U.S. Appl. No. 10/806,894.

Office action dated Jul. 12, 2007 from U.S. Appl. No. 10/806,894.

Office action dated Apr. 9, 2007 from U.S. Appl. No. 10/806,894.

Office action dated Jan. 3, 2007 from U.S. Appl. No. 10/806,894.

Office action dated Jul. 3, 2006 from U.S. Appl. No. 10/806,894.

Notice of allowance dated Jan. 28, 2008 from U.S. Appl. No. 11/102,062.

Office action dated Jun. 27, 2007 from U.S. Appl. No. 11/102,062.

Office action dated May 1, 2007 from U.S. Appl. No. 11/122,836.

Office action dated Nov. 14, 2007 from U.S. Appl. No. 11/122,836.

Office action dated Feb. 1, 2008 from U.S. Appl. No. 10/440,337.

Office action dated Nov. 15, 2006 from U.S. Appl. No. 10/440,337.

Office action dated May 3, 2006 from U.S. Appl. No. 10/440,337.

Notice of allowance dated Mar. 23, 2006 from U.S. Appl. No. 10/236,722.

Office action dated Sep. 28, 2005 from U.S. Appl. No. 10/236,722.

Office action dated Jul. 5, 2005 from U.S. Appl. No. 10/236,722.

Office action dated Apr. 19, 2005 from U.S. Appl. No. 10/236,722.

Office action dated Oct. 20, 2004 from U.S. Appl. No. 10/236,722.

Notice of allowance dated Mar. 23, 2006 from U.S. Appl. No. 10/612,271.

Notice of allowance dated Jul. 18, 2006 from U.S. Appl. No. 10/825,001.

Office action dated Jan. 6, 2006 from U.S. Appl. No. 10/825,001.

Notice of allowance dated Aug. 17, 2006 from U.S. Appl. No. 10/881,198.

Notice of allowance dated May 25, 2006 from U.S. Appl. No. 10/881,198.
Notice of allowance dated Mar. 5, 2007 from U.S. Appl. No. 10/893,210.
Notice of allowance dated Feb. 27, 2007 from U.S. Appl. No. 10/893,210.
Office action dated Sep. 12, 2006 from U.S. Appl. No. 10/893,210
Office action dated Jan. 14, 2008 from U.S. Appl. No. 11/471,148.
Office action dated Nov. 2, 2007 from U.S. Appl. No. 11/471,148.
Office action dated Sep. 20, 2007 from U.S. Appl. No. 11/471,148.
Office action dated Apr. 5, 2007 from U.S. Appl. No. 11/471,148.
Office action dated Jan. 14, 2008 from U.S. Appl. No. 11/471,738.
Office action dated Nov. 2, 2007 from U.S. Appl. No. 11/471,738.
Office action dated Sep. 20, 2007 from U.S. Appl. No. 11/471,738.
Office action dated Apr. 6, 2007 from U.S. Appl. No. 11/471,738.
Office action dated Sep. 24, 2007 from U.S. Appl. No. 10/862,132.
Office action dated Jul. 12, 2007 from U.S. Appl. No. 10/862,132.
Office action dated Jan. 22, 2007 from U.S. Appl. No. 10/862,132.
Office action dated Jul. 28, 2006 from U.S. Appl. No. 10/862,132.
Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000.
Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000.
Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.
Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003.
Xu, et al., *Modeling of Laser Spallation Drilling of Rocks for Gas—and Oilwell Drilling*, SPE 95746, 2005, Society of Petroleum Engineers Inc., presented at the 2005 SPE Annual Technical Conference and Exhibition held in Dallas, Texas, Oct. 9-12, 2005.
Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003.
Office Action from U.S. Appl. No. 11/485,199 mailed Sep. 24, 2008.
Office Action from U.S. Appl. No. 10/440,337 mailed Sep. 25, 2008.
Office Action from U.S. Appl. No. 11/102,062 mailed Sep. 23, 2008.
Office Action from U.S. Appl. No. 11/501,595 mailed Sep. 24, 2008.
Office Action dated Mar. 26, 2008 from U.S. Appl. No. 10/862,132.
Office Action dated Mar. 26, 2008 from U.S. Appl. No. 11/360,215.
Office Action dated Feb. 21, 2008 from U.S. Appl. No. 10/440,337.
Office Action dated Jun. 13, 2008 for U.S. Appl. No. 10/806,894.
Office Action for U.S. Appl. No. 11/360,215 dated Sep. 17, 2008.
Office Action for U.S. Appl. No. 10/962,132, dated Apr. 28, 2009.
Office Action for U.S. Appl. No. 11/360,215, dated Apr. 28, 2009.
Office Action for U.S. Appl. No. 11/485,199, dated Apr. 28, 2009.
Office Action for U.S. Appl. No. 11/122,836, dated May 13, 2009.
Notice of Allowance and Notice of Allowability for U.S. Appl. No. 11/471,148, dated May 20, 2009.
Notice of Allowance and Notice of Allowability for U.S. Appl. No. 11/471,738, dated May 28, 2009.
Office Action for U.S. Appl. No. 11/102,062, dated Nov. 12, 2009.
Office Action for U.S. Appl. No. 11/485,199, dated Nov. 18, 2009.
Office Action for U.S. Appl. No. 11/360,215, dated Dec. 7, 2009.
Office Action mailed Oct. 31, 2008, for U.S. Appl. No. 10/862,132.
Office Action mailed Nov. 18, 2008, for U.S. Appl. No. 11/122,836.
Office Action mailed Nov. 17, 2008, for U.S. Appl. No. 11/471,148.
Office Action mailed Nov. 18, 2008, for U.S. Appl. No. 11/471,738.
Office Action for U.S. Appl. No. 10/806,894, dated Dec. 17, 2008.
Office Action for U.S. Appl. No. 10/806,894 dated Jul. 10, 2009.
Office Action for U.S. Appl. No. 11/501,595, dated Aug. 17, 2009.
Office Action for U.S. Appl. No. 10/862,132 dated Dec. 30, 2009.
Office Action for U.S. Appl. No. 11/501,595 dated Feb. 5, 2010.
Office Action for U.S. Appl. No. 11/122,836 dated Feb. 22, 2010.
Office Action for U.S. Appl. No. 11/102,062 dated Feb. 24, 2010.
Notice of Allowance for U.S. Appl. No. 10/862,132 dated Apr. 1, 2010.
Office Action for U.S. Appl. No. 10/806,894 dated Apr. 1, 2010.

* cited by examiner

METHODS AND COMPOSITIONS FOR REDUCING THE PRODUCTION OF WATER AND STIMULATING HYDROCARBON PRODUCTION FROM A SUBTERRANEAN FORMATION

CROSS-REFERENCE TO RELATED APPLICATION

This application is a continuation-in-part of U.S. application Ser. No. 10/440,337, published as U.S. Patent Application Publication No. 2004/0229756, entitled "Method for Stimulating Hydrocarbon Production and Reducing the Production of Water from a Subterranean Formation," and filed on May 16, 2003 now abandoned and U.S. application Ser. No. 10/612,271, published as U.S. Patent Application Publication No. 2005/0000694, entitled "Methods of Reducing Water Permeability for Acidizing a Subterranean Formation," and filed on Jul. 2, 2003 now U.S. Pat. No. 7,182,136, which are incorporated herein by reference.

BACKGROUND OF THE INVENTION

The present invention relates to subterranean treatment fluids, and more particularly, the present invention relates to subterranean treatment fluids comprising relative permeability modifiers and methods for using such subterranean treatment fluids in subterranean operations to reduce the production of water from and stimulate hydrocarbon production in a subterranean formation.

The production of water with hydrocarbons from subterranean wells constitutes a major problem and expense in the production of the hydrocarbons. While hydrocarbon-producing wells are usually completed in hydrocarbon-bearing formations, such formations may contain, or may be adjacent to, water-bearing sections. Generally, the term "water-bearing section" refers to any portion of a subterranean formation that may produce water, including a hydrocarbon-bearing section that has sufficiently high water saturation such that water may be produced along with hydrocarbons. The high mobility of the water may allow it to flow into the well bore by way of natural fractures and/or high permeability streaks present in the formation. Over the life of such wells, the ratio of water to hydrocarbons recovered may be undesirable in view of the cost of producing the water, separating it from the hydrocarbons, and disposing of it, which can represent a significant economic loss.

Subterranean stimulation treatments have long been used in the field of hydrocarbon production to increase the flow of hydrocarbons to the well bore. One such stimulation treatment is hydraulic fracturing, where specialized fluids are pumped into the subterranean formation at sufficient pressures to create or enhance at least one fracture within the formation, thereby increasing fluid flow through the formation to the well bore. When a formation contains water-bearing sections, however, stimulation may lead to the undesired, increased production of water with the hydrocarbons.

Another subterranean stimulation treatment is acid stimulation (e.g., "acidizing"), in which an aqueous treatment fluid comprising an acid is introduced into the formation to dissolve acid-soluble materials that may clog or constrict formation channels, thereby potentially widening the pathways through which hydrocarbons may flow from the formation into the well bore. Acid stimulation treatments also may facilitate the flow of injected treatment fluids from the well bore into the formation. One method of acidizing, known as "fracture acidizing," usually comprises injecting an acidizing treatment fluid into the subterranean formation at a pressure sufficient to create or enhance at least one fracture within the formation. Another method of acidizing, known as "matrix acidizing," usually comprises injecting the acidizing treatment fluid into the formation at a pressure below that which would create or enhance at least one fracture within the subterranean formation. In certain circumstances, however, the acidizing treatment fluids may undesirably enter the water-bearing sections instead of the hydrocarbon-bearing sections in the formation because the water-bearing sections may be more permeable to the aqueous acidizing treatment fluid than the hydrocarbon-bearing sections. Thus, acid stimulation treatments may result in an undesirable increase in the production of water.

A variety of techniques have been used to reduce the production of undesired water and/or to divert the aqueous acidizing treatment fluid away from the water-bearing sections and into the hydrocarbon-bearing sections. One attempt has involved the injection of particulates, foams, or blocking polymers into the subterranean formation so as to plug off the water-bearing sections. Thus, the undesired production of water may be reduced, and, when used in an acid stimulation treatment, the acidizing treatment fluid may be diverted to the hydrocarbon-bearing sections rather than the water-bearing sections.

However, the use of these water-blocking techniques has proved to be problematic. For example, plugging off the water-bearing sections may not be suitable for treating a producing formation unless the injected solution (or material) can be injected solely into the offending water-bearing sections therein. Further, if a polymer solution is allowed to form a cross-linked polymer gel within a hydrocarbon-producing zone, the gel may reduce or stop the flow of hydrocarbons in addition to the flow of water. Even when a polymer solution is properly injected into a water-producing section, the cross-linked polymer gel formed therein may become unstable in the zone, due to factors such as thermal degradation, differences in the adsorption characteristics of the polymer and associated cross-linker, and the like. Furthermore, techniques geared toward injecting solutions (or materials) designed to plug off the water-bearing sections are limited because they may require expensive zonal isolation. Zonal isolation also may be inaccurate, which may lead to inadvertently plugging and/or damaging the hydrocarbon-bearing sections.

Recently, polymers referred to as relative permeability modifiers have been used, in some instances, to decrease the production of water with hydrocarbons. For example, relative permeability modifiers, such as polyacrylamide, have been introduced into hydrocarbon and water-producing formations so that the polymers may attach to adsorption sites on surfaces within the formations. Among other things, these relative permeability modifiers may reduce the flow of water through the formation. The use of relative permeability modifiers in hydrocarbon and water-producing formations to decrease the production of water involves less risk than other techniques and has the advantage of not requiring expensive zonal isolation techniques. However, the use of such relative permeability modifiers, e.g., polyacrylamides, has heretofore resulted in only small, temporary reductions in water production and/or unacceptable levels of reduction in hydrocarbon production.

SUMMARY OF THE INVENTION

The present invention relates to subterranean treatment fluids, and more particularly, the present invention relates to subterranean treatment fluids comprising relative permeability modifiers and methods for using such subterranean treatment fluids in subterranean operations to reduce the production of water from and stimulate hydrocarbon production in a subterranean formation.

An exemplary embodiment of a treatment fluid of the present invention is a permeability-modifying aqueous treatment fluid comprising a hydrophobically modified water-soluble polymer that comprises a polymer backbone comprising polar heteroatoms.

Another exemplary embodiment of a treatment fluid of the present invention is a permeability-modifying aqueous treatment fluid comprising a hydrophilic polymer that comprises a polymer backbone comprising polar heteroatoms, a hydrophobic compound capable of reacting with the hydrophilic polymer, and a surfactant.

An exemplary method of the present invention is a method for treating a subterranean formation to reduce its permeability to aqueous-based fluids comprising the steps of providing a permeability-modifying aqueous treatment fluid comprising a hydrophobically modified water-soluble polymer that comprises a polymer backbone comprising polar heteroatoms, and contacting the subterranean formation with the permeability-modifying aqueous treatment fluid.

Another exemplary method of the present invention is a method for treating a subterranean formation to reduce its permeability to aqueous-based fluids comprising the steps of providing a permeability-modifying aqueous treatment fluid comprising a hydrophilic polymer that comprises a polymer backbone comprising polar heteroatoms, a hydrophobic compound capable of reacting with the hydrophilic polymer, and a surfactant; and contacting the subterranean formation with the permeability-modifying aqueous treatment fluid.

Another exemplary method of the present invention is a method for fracturing a subterranean formation comprising the steps of providing a permeability-modifying aqueous treatment fluid comprising a hydrophobically modified water-soluble polymer that comprises a polymer backbone comprising polar heteroatoms; and injecting the permeability-modifying aqueous treatment fluid into the subterranean formation at a pressure sufficient to create or enhance at least one fracture therein.

Another exemplary method of the present invention is a method for fracturing a subterranean formation comprising the steps of providing a permeability-modifying aqueous treatment fluid comprising a hydrophilic polymer that comprises a polymer backbone comprising polar heteroatoms, a hydrophobic compound capable of reacting with the hydrophilic polymer, and a surfactant; and injecting the treatment fluid into the subterranean formation at a pressure sufficient to create or enhance at least one fracture therein.

Another exemplary method of the present invention is a method for acidizing a subterranean formation penetrated by a well bore comprising the steps of providing a permeability-modifying aqueous treatment fluid comprising a relative permeability modifier comprising a hydrophobically modified water-soluble polymer that comprises polar heteroatoms within the polymer backbone or a hydrophilically modified water-soluble polymer; providing an acidizing treatment fluid; injecting the permeability-modifying aqueous treatment fluid into the subterranean formation; and injecting the acidizing treatment fluid into the subterranean formation.

Another exemplary method of the present invention is a method for acidizing a subterranean formation penetrated by a well bore comprising the steps of providing a permeability-modifying aqueous treatment fluid comprising a hydrophilic polymer that comprises a polymer backbone comprising polar heteroatoms, a hydrophobic compound capable of reacting with the hydrophilic polymer, and a surfactant; providing an acidizing treatment fluid; injecting the permeability-modifying aqueous treatment fluid into the subterranean formation; and injecting the acidizing treatment fluid into the subterranean formation.

Another exemplary method of the present invention is a method for acidizing a subterranean formation penetrated by a well bore comprising the steps of providing a permeability-modifying aqueous treatment fluid comprising a hydrophilic polymer and a hydrophilic compound capable of reacting with the hydrophilic polymer; providing an acidizing treatment fluid; injecting the permeability-modifying aqueous treatment fluid into the subterranean formation; and injecting the acidizing treatment fluid into the subterranean formation.

The features and advantages of the present invention will be readily apparent to those skilled in the art upon a reading of the description of the exemplary embodiments, which follows.

DESCRIPTION OF EXEMPLARY EMBODIMENTS

The present invention relates to subterranean treatment fluids, and more particularly, the present invention relates to subterranean treatment fluids comprising relative permeability modifiers and methods for using such subterranean treatment fluids in subterranean operations to reduce the production of water from and stimulate hydrocarbon production in a subterranean formation.

The methods and compositions of the present invention provide permeability-modifying aqueous treatment fluids that generally comprise a relative permeability modifier, inter alia, that reduces the permeability of the subterranean formation to aqueous-based fluids without substantially changing the permeability to hydrocarbons. These aqueous treatment fluids of the present invention may be used, among other things, in water inhibition operations, hydraulic fracturing operations, and acid stimulation treatments. In certain embodiments, the relative permeability modifier may be a hydrophobically modified water-soluble polymer, wherein the hydrophobically modified water-soluble polymer may be a reaction product of a hydrophilic polymer and a hydrophobic compound. As used herein, "hydrophobically modified" refers to the incorporation into the hydrophilic polymer structure of hydrophobic groups, wherein the alkyl chain length is from about 4 to about 22 carbons. In another embodiment, the relative permeability modifier may be a hydrophilically modified water-soluble polymer, wherein the hydrophilic polymer may a reaction product of a hydrophilic polymer and a hydrophilic compound. As used herein, "hydrophilically modified" refers to the incorporation into the hydrophilic polymer structure of hydrophilic groups. The reactions needed to form the relative permeability modifiers of the present invention may occur prior to the addition of the relative permeability modifiers into the permeability-modifying aqueous treatment fluids of the present invention (e.g., pre-reacted embodiments), or they may occur in situ (e.g., in situ reaction embodiments).

I. Exemplary Water Inhibition Embodiments

In an exemplary embodiment, the permeability-modifying aqueous treatment fluids of the present invention may be used in water inhibition operations. When used in water inhibition operations, the permeability-modifying aqueous treatment fluids may comprise either the pre-reacted embodiments or the in situ reaction embodiments of the relative permeability modifiers. It is believed that the relative permeability modifiers, among other things, may attach to surfaces within the subterranean formation. The presence of the relative permeability modifiers in the subterranean formation may reduce the permeability of the treated zones of the subterranean formation to aqueous-based fluids without substantially changing the permeability to hydrocarbons. The desired volume of the permeability-modifying aqueous treatment fluids introduced into the subterranean formation is based, inter alia, on several properties of the zone to be treated, such as depth and volume of the zone, as well as the permeability and other physical properties of the material in the zone.

A. Exemplary Pre-Reacted Embodiments

In the pre-reacted embodiments of the present invention, the permeability-modifying aqueous treatment fluids of the present invention may comprise an aqueous-based fluid and a relative permeability modifier. Also, such permeability-modifying aqueous treatment fluids may be gelled by the addition of a gelling agent. Further, additives suitable for use in subterranean treatment operations may be added to the permeability-modifying aqueous treatment fluids of the present invention as desired.

The aqueous-based fluid used in the permeability-modifying aqueous treatment fluids of the present invention can be fresh water, salt water (e.g., water containing one or more salts, such as potassium chloride, dissolved therein), brine (e.g., saturated salt water), or seawater. Generally, the aqueous-based fluid may be any aqueous liquid provided that it does not adversely react with the other components of the treatment fluid. In an exemplary embodiment, the aqueous-based fluid used in the permeability-modifying aqueous treatment fluids of the present invention comprises salt water, inter alia, to help inhibit the swelling/migration of clay particles in the subterranean formations and/or zones being treated. Examples of suitable salts include, but are not limited to, chloride, bromide, acetate, and formate salts of ammonium, alkyl ammonium, potassium, sodium, calcium, magnesium, and zinc.

In certain embodiments, the relative permeability modifier present in the permeability modifying aqueous treatment fluids of the present invention may be a hydrophobically modified water-soluble polymer. The hydrophobically modified water-soluble polymers used in the present invention typically have a molecular weight in the range of from about 100,000 to about 10,000,000. In an exemplary embodiment, the hydrophobically modified water-soluble polymer may comprise a polymer backbone comprising polar heteroatoms. Generally, the polar heteroatoms present within the polymer backbone of the hydrophobically modified water-soluble polymer include, but are not limited to, oxygen, nitrogen, sulfur, or phosphorous.

Suitable hydrophobically modified water-soluble polymers may be a reaction product of a hydrophilic polymer and a hydrophobic compound that are capable of reacting with each other. In certain exemplary embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers such as, but not limited to, celluloses, chitosans, polyamides, polyetheramines, polyethyleneimines, polyhydroxyetheramines, polylysines, polysulfones, and starches. In an exemplary embodiment the starch is a cationic starch. A suitable cationic starch may be formed by reacting a starch, such as corn, maize, waxy maize, potato, tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In another embodiment, the relative permeability modifier present in the permeability modifying aqueous treatment fluids of the present invention may be a hydrophilically modified water-soluble polymer. The hydrophilically modified water-soluble polymers used in the present invention typically have a molecular weight in the range of from about 100,000 to about 10,000,000. In an exemplary embodiment, the hydrophilically modified water-soluble polymer comprises a polymer backbone comprising polar heteroatoms. Generally, the polar heteroatoms present within the polymer backbone of the hydrophilically modified water-soluble polymer include, but are not limited to, oxygen, nitrogen, sulfur, or phosphorous.

In one embodiment, the hydrophilically modified water-soluble polymer is a reaction product of a hydrophilic polymer and a hydrophilic compound that are capable of reacting with each other. The hydrophilic polymers suitable for forming the hydrophilically modified water-soluble polymers used in the present invention should be capable of reacting with hydrophilic compounds. In certain exemplary embodiments, suitable hydrophilic polymers include, homo-, co-, or terpolymers such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymer contains reactive amino groups in the polymer backbone or as pendant groups, which are capable of reacting with hydrophilic compounds. In an exemplary embodiment, the hydrophilic polymer comprises dialkyl amino pendant groups. In an exemplary embodiment, the hydrophilic polymer comprises a dimethyl amino pendant group and at least one monomer comprising dimethylaminoethyl methacrylate or dimethylaminopropyl methacrylamide.

In another exemplary embodiment, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers such as, but not limited to, celluloses, chitosans, polyamides, polyetheramines, polyethyleneimines, polyhydroxyetheramines, polylysines, polysulfones, and starches. In an exemplary embodiment the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers comprising halogen; sulfonates; sulfates; and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. Suitable polyethers include, but are not limited to, polyethylene oxides, polypropylene oxides, polybutylene oxides, and mixtures thereof. In an exemplary embodiment, the polyether comprises an epichlorohydrin terminated polyethylene oxide methyl ether.

The hydrophilically modified water-soluble polymers formed from the reaction of a hydrophilic polymer with a hydrophilic compound have estimated molecular weights in the range of from about 100,000 to about 10,000,000 and may have weight ratios of the hydrophilic polymers to the polyethers in the range of from about 1:1 to about 10:1. Suitable hydrophilically modified water-soluble polymer having molecular weights and weight ratios in the ranges set forth above include, but are not limited to, the reaction product of polydimethylaminoethyl methacrylate with epichlorohydrin terminated polyethyleneoxide methyl ether; the reaction product of polydimethylaminopropyl methacrylamide with epichlorohydrin terminated polyethyleneoxide methyl ether; and the reaction product of poly(acrylamide/dimethylaminopropyl methacrylamide) with epichlorohydrin terminated polyethyleneoxide methyl ether. In an exemplary embodiment, the hydrophilically modified water-soluble polymer comprises the reaction product of a polydimethylaminoethyl methacrylate with epichlorohydrin terminated polyethyleneoxide methyl ether having a weight ratio of polydimethylaminoethyl methacrylate to epichlorohydrin terminated polyethyleneoxide methyl ether of 3:1.

Suitable relative permeability modifiers generally should be present in the permeability-modifying aqueous treatment fluids of the present invention in an amount in the range of from about 0.02% to about 10% by weight of the permeability-modifying aqueous treatment fluid. In another exemplary embodiment, the relative permeability modifiers are present in the permeability-modifying aqueous treatment fluids of the present invention in an amount in the range of from about 0.05% to about 1.0% by weight of the permeability-modifying aqueous treatment fluid.

In addition, based on formation conditions, the permeability-modifying aqueous treatment fluids of the present invention may be gelled by the addition of a suitable gelling agent, for example, a galactomannan gelling agent. Galactomannan gelling agents suitable for use in the permeability-modifying aqueous treatment fluids of the present invention comprise naturally occurring gums and their derivatives, such as guar, locust bean, tara, honey locust, tamarind, karaya, tragacanth, carrageenan, and the like. These gums are generally characterized as comprising a linear backbone having various amounts of galactose units attached thereto. The gums also can be characterized as comprising one or more functional groups such as cis-hydroxyl, hydroxyl, carboxyl, sulfate, sulfonate, amino, or amide. In an exemplary embodiment, the gelling agents suitable for use in the permeability-modifying aqueous treatment fluids of the present invention comprise at least one or more of guar, hydroxyethylguar, hydroxypropylguar, carboxymethylguar, carboxymethylhydroxyethylguar, and carboxymethylhydroxypropylguar.

In certain exemplary embodiments wherein the permeability-modifying aqueous treatment fluids of the present invention are gelled, one or more of the above-mentioned galactomannan gelling agents may be dissolved in the permeability-modifying aqueous treatment fluids to form a suitable viscous aqueous gel. Generally, the galactomannan gelling agent or agents may be present in the permeability-modifying aqueous treatment fluids in a sufficient amount to provide the desired gelling of the permeability-modifying aqueous treatment fluids.

The permeability-modifying aqueous treatment fluids may have a pH suited to the environment of the subterranean formation. For example, the permeability-modifying aqueous treatment fluids of the present invention comprising the pre-reacted relative permeability modifier generally may have a pH in the range of from about 4 to about 8.

As known to those skilled in the art, the permeability-modifying aqueous treatment fluids of the present invention also may contain additional additives suitable for use in subterranean operations including, but not limited to, scale inhibitors, clay stabilizers, and corrosion inhibitors.

Moreover, in an exemplary embodiment, after the permeability-modifying aqueous treatment fluids of the present invention are injected into the subterranean formation, an after-flush of a hydrocarbon liquid, such as kerosene, diesel oil or crude oil, or a hydrocarbon or inert gas, such as methane and natural gas or nitrogen (when the formation produces gas), may optionally be introduced into the formation. While not required for the modified water-soluble polymer to be effective, the after-flush may facilitate the subsequent flow of hydrocarbons through the formation.

In an exemplary embodiment, prior to injection of the aqueous treatment fluids of the present invention into the subterranean formation, an optional pre-flush of a well treatment fluid may be injected into the subterranean formation. Among other things, the pre-flush cleans the formation to be treated in order to obtain more effective interaction of the modified water-soluble polymers with the formation surface. Without being limited by theory, it is believed that the interaction of the relative permeability modifier with the formation surface may be dependent upon the presence of any existing adsorbed species, for example, surface impurities, paraffin, asphaltenes, and the like. Thus, a pretreatment step may be necessary for a given formation to be treated.

In an exemplary embodiment, the well treatment fluids used in the pre-flush may comprise a mutual solvent. The mutual solvents suitable for use in the pre-flush, among other things, may act to remove hydrocarbons adhering to formation material. In this regard, any mutual solvent suitable for solubilizing hydrocarbons may be used in the pre-flush, for example, terpenes (such as limonene), $C_3$ to $C_9$ alcohols, glycol-ether (such as ethylene glycol monobutyl ether, "EGMBE"), or mixtures thereof. In another exemplary embodiment, the well treatment fluids of the pre-flush may further comprise a surfactant. In additional exemplary embodiments, the well treatment fluids of the pre-flush should be an aqueous fluid that comprises a chemical that interacts with the formation surface within the porous medium and facilitates the penetration of the modified water-soluble polymer further into the hydrocarbon-bearing section as described in U.S. Pat. No. 6,364,016, the relevant disclosure of which is incorporated herein by reference.

B. Exemplary in situ Reaction Embodiments

In certain embodiments, the relative permeability modifier may be formed by reaction in situ. In an exemplary embodiment, the hydrophobically modified water-soluble polymer may be formed by the in situ reaction between a hydrophilic polymer and a hydrophobic compound. In these embodiments, the permeability-modifying aqueous treatment fluids of the present invention may comprise an aqueous-based fluid, a hydrophilic polymer that comprises a polymer backbone comprising polar heteroatoms, a hydrophobic compound capable of reacting with the hydrophilic polymer, and a surfactant. Optionally, the permeability-modifying aqueous treatment fluids further may comprise a pH-adjusting agent. Also, the permeability-modifying aqueous treatment fluids may be gelled by the addition of a gelling agent of the type and amount described above. Further, additives suitable for use in subterranean treatment operations may be added to the permeability-modifying aqueous treatment fluids of the present invention as desired.

The aqueous-based fluids, hydrophilic polymers, and hydrophobic compounds for use in these permeability modifying aqueous treatment fluids may be the same as those described above. Further, the hydrophobically modified polymer formed by the in situ reaction may be the same as those described above.

The hydrophilic polymer generally should be present in the permeability-modifying aqueous treatment fluids in an amount necessary to provide the desired degree of water control. In an exemplary embodiment, the hydrophilic polymer is present in the permeability-modifying aqueous treatment fluids of the present invention in an amount in the range of from about 0.1% to about 10% by weight of the permeability-modifying aqueous treatment fluid. In an exemplary embodiment, the hydrophilic polymer is present in the permeability-modifying aqueous treatment fluids of the present invention in an amount in the range of from about 0.2% to about 1.5% by weight of the permeability-modifying aqueous treatment fluid.

The hydrophobic compound generally should be present in the permeability-modifying aqueous treatment fluids in an amount necessary to provide the desired degree of water control. In an exemplary embodiment, the hydrophobic compound is present in the permeability-modifying aqueous treatment fluids of the present invention in an amount in the range of from about 0.01% to about 5% by weight of the permeability-modifying aqueous treatment fluid. In an exemplary embodiment, the hydrophobic compound is present in the permeability-modifying aqueous treatment fluids of the present invention in an amount in the range of from about 0.02% to about 0.5% by weight of the permeability-modifying aqueous treatment fluid.

Further, the in situ reaction between the hydrophilic polymer and the hydrophobic compound generally is effected at subterranean formation temperatures greater than about 75° F. In an exemplary embodiment, the in situ reaction between the hydrophilic polymer and the hydrophobic compound is effected at subterranean formation temperatures greater than about 100° F.

Depending on certain well bore and formation conditions, a shut-in period of from about one minute to several hours may be required to permit the in situ reaction of the hydrophilic polymer and the hydrophobic compound. During the shut-in period, the hydrophilic polymer and the hydrophobic polymer react to form the hydrophobically modified water-soluble polymer: Generally, the length of the well bore and the downhole temperature should determine the length of any shut-in period. For example, a deep well bore with temperatures greater than or equal to about 200° F. may not require a shut-in period. Moreover, shallower, cooler formations may require longer shut-in periods that may extend up to about 24 hours. Those skilled in the art will be able to readily determine the necessity for, and duration of, any shut-in periods that may be useful to permit the appropriate in situ reaction.

Due to the insolubility of hydrophobic compounds in aqueous fluids, a surfactant is present in the permeability-modifying aqueous treatment fluids of the present invention. The surfactant may be selected based on at least its ability to promote the dissolution of the hydrophobic compounds in the permeability-modifying aqueous treatment fluids of the present invention. The surfactant may be anionic, cationic, amphoteric, or neutral. Surfactants suitable for use in the current invention include, but are not limited to, alkyl ammonium surfactants, betaines, alkyl ether sulfates, alkyl ether sulfonates, and ethoxylated alcohols. Generally, the surfactant is present in the permeability-modifying aqueous treatment fluids of the present invention in an amount so that the hydrophobic compound disperses in the permeability-modifying aqueous treatment fluids of the present invention. In an exemplary embodiment, the surfactant is present in the treatment fluids of the present invention in an amount in the range of from about 0.1% to about 2% by weight of the permeability-modifying aqueous treatment fluid.

Optionally, the permeability-modifying aqueous treatment fluids of the present invention may comprise a pH-adjusting agent if desired. The pH-adjusting agent may facilitate the in situ reaction between the hydrophilic polymer and the hydrophobic compound by providing a suitable pH, e.g., of about 8 or higher, in the permeability-modifying aqueous treatment fluids of the present invention. Examples of suitable pH-adjusting agents include buffers, alkali metal hydroxides, alkali metal carbonates, alkali metal phosphates, and other similar compounds known by those skilled in the art.

As discussed in the pre-reacted embodiments, an optional pre-flush or an optional post-flush may be used.

As known to those skilled in the art, the permeability-modifying aqueous treatment fluids of the present invention also may contain additional additives suitable for use in subterranean operations including, but not limited to, scale inhibitors, clay stabilizers, and corrosion inhibitors.

In another embodiment of the present invention, the hydrophilically modified water-soluble polymer may be formed by the in situ reaction between a hydrophilic polymer and a hydrophilic compound. In these embodiments, the permeability modifying treatment fluids of the present invention generally comprise an aqueous-based fluid, a hydrophilic polymer, and a hydrophilic compound. Optionally, the permeability-modifying aqueous treatment fluids further may comprise a pH-adjusting agent. Also, the permeability-modifying aqueous treatment fluids may be gelled by the addition of a gelling agent of the type and amount described above. Further, additives suitable for use in subterranean treatment operations may be added to the permeability-modifying aqueous treatment fluids of the present invention as desired.

The aqueous-based fluids, hydrophilic polymers, hydrophilic compounds, pH-adjusting agent, and gelling agents for use in these permeability modifying aqueous treatment fluids may be the same as those described above. Further, the hydrophilically modified polymer formed by the in situ reaction may be the same as those described above.

The hydrophilic polymer generally should be present in the permeability-modifying aqueous treatment fluids in an amount necessary to provide the desired degree of water control. In an exemplary embodiment, the hydrophilic polymer is present in the permeability-modifying aqueous treatment fluids of the present invention in an amount in the range of from about 0.1% to about 10% by weight of the permeability-modifying aqueous treatment fluid. In an exemplary embodiment, the hydrophilic polymer is present in the permeability-modifying aqueous treatment fluids of the present invention in an amount in the range of from about 0.2% to about 1.5% by weight of the permeability-modifying aqueous treatment fluid.

The hydrophilic compound generally should be present in the permeability-modifying aqueous treatment fluids in an amount necessary to provide the desired degree of water control. In an exemplary embodiment, the hydrophilic compound is present in the permeability-modifying aqueous treatment fluids of the present invention in an amount in the range of from about 0.01% to about 5% by weight of the permeability-modifying aqueous treatment fluid. In an exemplary embodiment, the hydrophilic compound is present in the permeability-modifying aqueous treatment fluids of the present invention in an amount in the range of from about 0.02% to about 0.5% by weight of the permeability-modifying aqueous treatment fluid.

Further, the in situ reaction between the hydrophilic polymer and the hydrophilic compound generally is effected at subterranean formation temperatures greater than about 75° F. In an exemplary embodiment, the in situ reaction between the hydrophilic polymer and the hydrophilic compound is effected at subterranean formation temperatures greater than about 100° F.

Depending on certain well bore and formation conditions, a shut-in period of up to about several hours may be required to permit the in situ reaction between the hydrophilic polymer and the hydrophilic compound. During the shut-in period, the hydrophilic polymer and the hydrophilic compound react to form the hydrophilically modified water-soluble polymer. Generally, the length of the well bore and the downhole temperature should determine the length of any shut-in period. For example, a deep well bore with temperatures greater than or equal to about 200° F. may not require a shut-in period. Moreover, shallower, cooler formations should require longer shut-in periods that may extend up to about 24 hours. Those skilled in the art will be able to readily determine the necessity for, and duration of, any shut-in periods that may be useful to permit the appropriate in situ reaction.

As discussed in the pre-reacted embodiments, an optional pre-flush or an optional post-flush may be used.

As known to those skilled in the art, the permeability-modifying aqueous treatment fluids of the present invention also may contain additional additives suitable for use in subterranean operations including, but not limited to, scale inhibitors, clay stabilizers, and corrosion inhibitors.

II. Exemplary Fracture Stimulation Embodiments

In another embodiment, the permeability-modifying aqueous treatment fluids of the present invention, described above, may be used in the stimulation and/or restimulation of a subterranean formation, e.g., hydraulic fracturing. In the fracture stimulation embodiments, the permeability-modifying aqueous treatment fluids of the present invention may be used prior to the use of stimulation fluids, simultaneously with the use of stimulation fluids, and/or independently of stimulation fluids. In an exemplary embodiment, the permeability-modifying aqueous treatment fluids of the present invention may be injected into a subterranean formation, at a pressure sufficient to create or enhance at least one fracture therein. Generally, the desired volume of the permeability-modifying aqueous treatment fluids introduced into the subterranean formation is based, inter alia, on several properties of the zone to be treated, such as depth and volume of the zone, as well as the permeability and other physical properties of the material in the zone. Where used simultaneously with the use of a stimulation fluid, the permeability-modifying aqueous treatment fluid and the stimulation fluid may, in one exemplary embodiment, be injected into the formation at about the same rate. Furthermore, where used simultaneously with the use of a stimulation fluid, the permeability-modifying aqueous treatment fluid and the stimulation fluid may be combined prior to their injection into the formation.

When used in hydraulic fracturing embodiments, the permeability-modifying aqueous treatment fluids of the present invention may comprise either the pre-reacted embodiments or the in situ reaction embodiments of such permeability-modifying aqueous treatment fluids. Moreover, it is believed that the relative permeability modifiers present in the aqueous treatment fluids of the present invention (or formed by reaction in situ), may attach to surfaces within the subterranean formation. The presence of the relative permeability modifiers in the subterranean formation may reduce the permeability of the treated zones of the formation to aqueous-based fluids without substantially changing the permeability to hydrocarbons. As described above, where the reaction takes place in situ, a shut-in period of up to about 24 hours may be beneficial based, inter alia, on factors such as the downhole temperature and measured depth of the well bore. In an exemplary embodiment, the shut-in period may take place after the stimulation operations are complete.

In an exemplary embodiment, where used in hydraulic fracturing, the aqueous treatment fluids of the present invention further may comprise proppant. Any proppant known to those skilled in the art is suitable including, for example, graded sand, bauxite, ceramic materials, glass materials, walnut hulls, polymer beads, and the like.

Where injected after the permeability-modifying aqueous treatment fluids of the present invention, the stimulation fluid, inter alia, should displace or drive the permeability-modifying aqueous treatment fluids into at least one created or enhanced fracture. In an exemplary embodiment, the stimulation fluid is injected into the subterranean formation at a pressure sufficient to create or enhance at least one fracture therein. After injection, the gelled (and possibly crosslinked) stimulation fluid may be caused to break, e.g., revert to a less viscous fluid. In an exemplary embodiment, the time needed to break the gel may be less than or equal to the shut-in period (if any). Afterwards, production of the hydrocarbons may be initiated from the treated subterranean formation.

Generally, the stimulation fluid may be any aqueous-based fluid suitable for use in fracturing operations. In an exemplary embodiment, the stimulation fluid may be gelled. In an exemplary embodiment, the stimulation fluid may be crosslinked. In an exemplary embodiment, the stimulation fluid may comprise proppant. As will be understood by those skilled in the art, a variety of conventional additives can be included in the stimulation fluids of this invention, such as gel stabilizers, gel breakers, clay stabilizers, bactericides, fluid loss additives, and the like, which do not adversely react with the stimulation fluids or prevent their use in a desired manner.

The following is a nonlimiting list of known methods of fracturing a hydrocarbon-bearing formation that are suitable for use in the present invention: U.S. Pat. Nos. 5,944,106 and 6,070,664, the relevant disclosures of which are incorporated herein by reference. These methods, as well as other methods of fracturing a formation, may be modified to incorporate the separate step of introducing the permeability-modifying aqueous treatment fluids of the present invention.

III. Exemplary Acid Stimulation Embodiments

As previously mentioned, the permeability-modifying aqueous treatment fluids of the present invention may be used in acid stimulation treatments, such as matrix-acidizing and fracture-acidizing processes. In the acid stimulation embodiments, the permeability-modifying aqueous treatment fluids of the present invention may be used prior to the use of acidizing treatment fluids and/or simultaneously with the use of acidizing treatment fluids. Where used simultaneously with the use of an acidizing treatment fluid, the permeability-modifying aqueous treatment fluid and the acidizing treatment fluid may, in one exemplary embodiment, be injected into the formation at about the same rate.

In the acid stimulation embodiments, the pressure used to inject the permeability-modifying aqueous treatment fluids of the present invention may, but need not, be high enough to create or enhance at least one fracture in the subterranean formation, depending on whether a fracture-acidizing or a matrix-acidizing operation is employed. In matrix acidizing, the permeability-modifying aqueous treatment fluids are typically injected into the subterranean formation at a rate below the rate that would create a pressure necessary to create or enhance at least one fracture therein. When used in conjunction with a fracture-acidizing operation, the permeability-modifying aqueous treatment fluids may be injected into the subterranean formation (whether deployed prior to the acidizing treatment fluid, simultaneously with the acidizing treatment fluid, or both) at a pressure sufficient to create or enhance at least one fracture in the formation. Further, the desired volume of the permeability-modifying aqueous treatment fluids introduced into the subterranean formation is based, inter alia, on the volume of the acidizing treatment fluid used and on several properties of the zone to be treated, such as depth and volume of the zone, as well as the permeability and other physical properties of the material in the zone. In an exemplary embodiment, where used in fracture acidizing processes, the acidizing treatment fluid may be injected into the subterranean form at a pressure sufficient to create or enhance at least one fracture therein.

Among other things, the use of the above-mentioned relative permeability modifiers in acid stimulation treatments may provide enhanced diversion of the acidizing treatment fluids within the subterranean formation. For example, in one embodiment, the permeability-modifying aqueous treatment fluids of the present invention may be injected into the subterranean formation prior to the injection of an acidizing treatment fluid. The relative permeability modifiers present in the permeability-modifying aqueous treatment fluids (or formed by reaction in situ) may reduce the permeability of the treated zone to aqueous-based fluids, which may retard the migration of such fluids into the treated zone. More specifically, the permeability-modifying aqueous-based fluids should flow through the areas of least resistance, e.g., the water-bearing sections. It is believed that, in at least one embodiment, the relative permeability modifiers may attach to surfaces within the water-bearing sections of the formation. The presence of the relative permeability modifiers in the subterranean formation may reduce the permeability of the treated zones of the formation to aqueous-based fluids without substantially changing the permeability to hydrocarbons. Next, a matrix-acidizing treatment fluid (which is an aqueous-based fluid) is injected into the formation to stimulate the hydrocarbon-bearing section. Because the relative permeability modifiers within the formation may reduce the flow of aqueous-based fluids through the water-bearing section, the matrix-acidizing treatment fluid may be at least partially diverted to another zone of the formation, e.g., from the water-bearing section to the hydrocarbon-bearing section.

As desired by one skilled in the art, mechanical methods to isolate the water-bearing section may be used in conjunction with the permeability-modifying aqueous treatment fluids of the present invention.

The following are some nonlimiting known methods of acidizing a hydrocarbon-bearing formation for use in the present invention: U.S. Pat. Nos. 2,863,832; 2,910,436; 3,215,199; 3,251,415; 3,297,090; 3,307,630; and 3,441,085, the relevant disclosures of which are incorporated herein by reference. These methods, as well as other methods of acidizing a formation, may be modified to incorporate the separate step of introducing the permeability-modifying aqueous treatment fluids of the present invention. Moreover, the treatment steps involving the permeability-modifying aqueous treatment fluids of the present invention and the acidizing treatment fluids can be repeated as necessary, or as desired.

As previously discussed, an optional post-flush may be used in the acid stimulation embodiments to facilitate the production of hydrocarbons. Likewise, an optional pre-flush with a well treatment fluid also may be used in the acid stimulation embodiments, inter alia, to clean the formation to be treated.

An exemplary embodiment of a treatment fluid of the present invention is a permeability-modifying aqueous treatment fluid comprising a hydrophobically modified water-soluble polymer that comprises a polymer backbone comprising polar heteroatoms.

Another exemplary embodiment of a treatment fluid of the present invention is a permeability-modifying aqueous treatment fluid comprising a hydrophilic polymer that comprises a polymer backbone comprising polar heteroatoms, a hydrophobic compound capable of reacting with the hydrophilic polymer, and a surfactant.

An exemplary method of the present invention is a method for treating a subterranean formation to reduce its permeability to aqueous-based fluids comprising the steps of providing a permeability-modifying aqueous treatment fluid comprising a hydrophobically modified water-soluble polymer that comprises a polymer backbone comprising polar heteroatoms; and contacting the subterranean formation with the permeability-modifying aqueous treatment fluid.

Another exemplary method of the present invention is a method for treating a subterranean formation to reduce its permeability to aqueous-based fluids comprising the steps of providing a permeability-modifying aqueous treatment fluid comprising a hydrophilic polymer that comprises a polymer backbone comprising polar heteroatoms, a hydrophobic compound capable of reacting with the hydrophilic polymer, and a surfactant; and contacting the subterranean formation with the permeability-modifying aqueous treatment fluid.

Another exemplary method of the present invention is a method for fracturing a subterranean formation comprising the steps of providing a permeability-modifying aqueous treatment fluid comprising a hydrophobically modified water-soluble polymer that comprises a polymer backbone comprising polar heteroatoms; and injecting the permeability-modifying aqueous treatment fluid into the subterranean formation at a pressure sufficient to create or enhance at least one fracture therein.

Another exemplary method of the present invention is a method for fracturing a subterranean formation comprising the steps of providing a permeability-modifying aqueous treatment fluid comprising a hydrophilic polymer that comprises a polymer backbone comprising polar heteroatoms, a hydrophobic compound capable of reacting with the hydrophilic polymer, and a surfactant; and injecting the treatment fluid into the subterranean formation at a pressure sufficient to create or enhance at least one fracture therein.

Another exemplary method of the present invention is a method for acidizing a subterranean formation penetrated by a well bore comprising the steps of providing a permeability-modifying aqueous treatment fluid comprising a relative permeability modifier comprising a hydrophobically modified water-soluble polymer that comprises polar heteroatoms within the polymer backbone or a hydrophilically modified water-soluble polymer; providing an acidizing treatment fluid; injecting the permeability-modifying aqueous treatment fluid into the subterranean formation; and injecting the acidizing treatment fluid into the subterranean formation.

Another exemplary method of the present invention is a method for acidizing a subterranean formation penetrated by a well bore comprising the steps of providing a permeability-modifying aqueous treatment fluid comprising a hydrophilic polymer that comprises a polymer backbone comprising polar heteroatoms, a hydrophobic compound capable of reacting with the hydrophilic polymer, and a surfactant; providing an acidizing treatment fluid; injecting the permeability-modifying aqueous treatment fluid into the subterranean formation; and injecting the acidizing treatment fluid into the subterranean formation.

Another exemplary method of the present invention is a method for acidizing a subterranean formation penetrated by a well bore comprising the steps of providing a permeability-modifying aqueous treatment fluid comprising a hydrophilic polymer and a hydrophilic compound capable of reacting with the hydrophilic polymer; providing an acidizing treatment fluid; injecting the permeability-modifying aqueous treatment fluid into the subterranean formation; and injecting the acidizing treatment fluid into the subterranean formation.

To facilitate a better understanding of the present invention, the following examples of preferred embodiments are given. In no way should the following examples be read to limit, or to define, the scope of the invention.

Example 1

Permeability reduction tests were performed using two treatment solutions and a multipressure tap Hassler sleeve containing a Berea sandstone core. These permeability reduction tests were performed at 175° F. Further, Test No. 1 was conducted using a brine containing 2% by weight potassium chloride, and Test No. 2 was conducted using a brine containing 7% potassium chloride. Two treatment solutions were prepared for this series of tests.

The treatment solution used in Test No. 1 comprised 5,000 ppm of a sample polymer and 500 ppm of "ARQUAD® DMCB 80" dissolved in 2% potassium chloride brine. "ARQUAD® DMCB 80" is a surfactant that is commercially available from Akzo Nobel Inc., Chicago, Ill. The sample polymer comprises a hydrophobically modified water-soluble polymer that comprises a polymer backbone comprising polar heteroatoms formed from the reaction of a cationic starch and an organic acid derivative, such as octenyl acid or dodecenyl succinic acid.

The treatment solution used in Test No. 2 comprised 5,000 ppm of the sample polymer dissolved in 7% potassium chloride brine.

The following procedure was used for this series of tests, the results of which are provided in Table 1. For each test, the above-described brines were flowed through the Berea core, followed by oil (kerosene), followed by brine. This third brine flow was maintained until the pressure stabilized, yielding an initial brine permeability. Next, a treatment solution was flowed into the core. Next, the brine flow was reestablished until the pressure stabilized, yielding a final permeability from which the brine permeability was calculated using the formula $[1-(\text{final permeability/initial permeability})]\times 100$. The multipressure tap Hassler sleeve allowed the core permeability to be divided into four segments. In the tests, the initial brine flow was from segment 1 to segment 4. The treatment solution flow was from segment 4 to segment 1, and the final brine flow was from segment 1 to segment 4. The results of the tests are provided below in Table 1.

TABLE 1

| Test | Sample Polymer Concentration (ppm) | Brine | Surfactant | Surfactant Concentration | Initial Water Permeability (milli Darcy) | Water Permeability Reduction |
|---|---|---|---|---|---|---|
| Test No. 1 | 5000 | 2% KCL | ARQUAD DMCB-80 | 500 ppm | 90 | 85% |
| Test No. 2 | 5000 | 7% KCL | None | None | 120 | 69% |

This example indicates, inter alia, that a relative permeability modifier used in the permeability-modifying aqueous treatment fluids of the present invention may reduce the permeability of a formation to aqueous-based fluids.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of acidizing a subterranean formation penetrated by a well bore comprising:
   providing a permeability-modifying aqueous treatment fluid comprising:
   a relative permeability modifier comprising a hydrophobically modified water-soluble polymer formed from:
   a reaction comprising a hydrophilic polymer and a hydrophobic compound, wherein the hydrophobically modified water-soluble polymer formed from the reaction has a molecular weight in the range of about 100,000 to about 10,000,000, or
   a polymerization reaction comprising a hydrophilic monomer and a hydrophobically modified hydrophilic monomer, wherein the hydrophobically modified water-soluble polymer formed from the polymerization reaction has a molecular weight in the range of about 250,000 to about 3,000,000,
   wherein the hydrophobically modified water-soluble polymer comprises a polymer backbone comprising polar heteroatoms and a hydrophobic branch that comprises an organic acid derivative selected from the group consisting of: an anhydride of octenyl succinic acid; an ester of octenyl succinic acid; an amide of octenyl succinic acid; an anhydride of dodecenyl succinic acid; an ester of dodecenyl succinic acid; and an amide of dodecenyl succinic acid, and wherein the hydrophobically modified water-soluble polymer reduces the permeability of the subterranean formation to an aqueous-based fluid;

providing an acidizing treatment fluid comprising an acid;

injecting the permeability-modifying aqueous treatment fluid into the subterranean formation; and injecting the acidizing treatment fluid into the subterranean formation.

2. The method of claim 1 wherein the permeability-modifying aqueous treatment fluid further comprises an aqueous-based fluid.

3. The method of claim 1 wherein the relative permeability modifier reduces the permeability of a zone of the subterranean formation to aqueous-based fluids, thereby diverting the acidizing treatment fluid to another zone of the subterranean formation.

4. The method of claim 1 wherein the polar heteroatoms present within the polymer backbone of the hydrophobically modified water-soluble polymer comprise at least one heteroatom selected from the group consisting of: oxygen, nitrogen, sulfur, and phosphorous.

5. The method of claim 1 wherein the hydrophobically modified water-soluble polymer is present in the permeability-modifying aqueous treatment fluid in an amount in the range of about 0.02% to about 10% by weight of the permeability-modifying aqueous treatment fluid.

6. The method of claim 1 wherein the hydrophobically modified water-soluble polymer is a reaction product of a hydrophilic polymer that comprises a polymer backbone comprising polar heteroatoms and a hydrophobic compound.

7. The method of claim 6 wherein the hydrophilic polymer comprises at least one polymer selected from the group consisting of: a cellulose, a polyamide, a polyetheramine, a polyhydroxyetheramine, a polysulfone, and a starch.

8. The method of claim 7 wherein the at least one polymer comprises the starch, wherein the starch comprises a cationic starch.

9. The method of claim 1 wherein the permeability-modifying aqueous treatment fluid further comprises a gelling agent.

10. The method of claim 9 wherein the permeability-modifying aqueous treatment fluid further comprises proppant.

11. The method of claim 1 wherein the permeability-modifying aqueous treatment fluid is injected into the subterranean formation at a pressure sufficient to create or enhance at least one fracture therein.

12. The method of claim 1 wherein the acidizing treatment fluid is injected into the subterranean formation at a pressure sufficient to create or enhance at least one fracture therein.

13. The method of claim 1 wherein the permeability-modifying aqueous treatment fluid is injected into the subterranean formation prior to the acidizing treatment fluid.

14. The method of claim 1 wherein the permeability-modifying aqueous treatment fluid is injected into the subterranean formation simultaneously with the acidizing treatment fluid.

15. A method of acidizing a subterranean formation penetrated by a well bore comprising:

providing a permeability-modifying aqueous treatment fluid comprising:

a relative permeability modifier comprising a hydrophobically modified water-soluble polymer formed from:

a reaction comprising a hydrophilic polymer and a hydrophobic compound, wherein the hydrophobically modified water-soluble polymer formed from the reaction has a molecular weight in the range of about 100,000 to about 10,000,000, or a polymerization reaction comprising a hydrophilic monomer and a hydrophobically modified hydrophilic monomer, wherein the hydrophobically modified water-soluble polymer formed from the polymerization reaction has a molecular weight in the range of about 250,000 to about 3,000,000, wherein the hydrophobically modified water-soluble polymer comprises a polymer backbone comprising polar heteroatoms and a hydrophobic branch that comprises an organic acid derivative selected from the group consisting of: an anhydride of octenyl succinic acid; an ester of octenyl succinic acid; an amide of octenyl succinic acid; an anhydride of dodecenyl succinic acid; an ester of dodecenyl succinic acid; and an amide of dodecenyl succinic acid, and wherein the hydrophobically modified water-soluble polymer reduces the permeability of a zone of the subterranean formation to an aqueous-based fluid;

providing an acidizing treatment fluid comprising an acid;

injecting the permeability-modifying aqueous treatment fluid into the subterranean formation; and injecting the acidizing treatment fluid into the subterranean formation so that the hydrophobically modified water-soluble polymer present in the subterranean formation diverts the acidizing treatment fluid to another zone of the subterranean formation.

16. The method of claim 15 wherein the permeability-modifying aqueous treatment fluid further comprises an aqueous-based fluid.

17. The method of claim 15 wherein the polar heteroatoms present within the polymer backbone of the hydrophobically modified water-soluble polymer comprises at least one heteroatom selected from the group consisting of: oxygen, nitrogen, sulfur, and phosphorous.

18. The method of claim 15 wherein the hydrophobically modified water-soluble polymer is present in the permeability-modifying aqueous treatment fluid in an amount in the range of about 0.02% to about 10% by weight of the permeability-modifying aqueous treatment fluid.

19. The method of claim 15 wherein the hydrophobically modified water-soluble polymer is a reaction product of a hydrophilic polymer that comprises a polymer backbone comprising polar heteroatoms and a hydrophobic compound.

20. The method of claim 19 wherein the hydrophilic polymer comprises at least one polymer selected from the group consisting of: a cellulose, a polyamide, a polyetheramine, a polyhydroxyetheramine, a polysulfone, and a starch.

21. The method of claim 20 wherein at least one polymer comprises the starch, wherein the starch comprises a cationic starch.

22. The method of claim 15 wherein the permeability-modifying aqueous treatment fluid further comprises a gelling agent.

23. The method of claim 22 wherein the permeability-modifying aqueous treatment fluid further comprises proppant.

24. The method of claim 15 wherein the permeability-modifying aqueous treatment fluid is injected into the subterranean formation at a pressure sufficient to create or enhance at least one fracture therein.

25. The method of claim 15 wherein the acidizing treatment fluid is injected into the subterranean formation at a pressure sufficient to create or enhance at least one fracture therein.

26. The method of claim 15 wherein the permeability-modifying aqueous treatment fluid is injected into the subterranean formation prior to the acidizing treatment fluid.

27. The method of claim 15 wherein the permeability-modifying aqueous treatment fluid is injected into the subterranean formation simultaneously with the acidizing treatment fluid.

28. The method of claim 1 wherein the polar heteroatoms comprise at least one heteroatom selected from the group consisting of: oxygen, sulfur, and phosphorous.

29. The method of claim 15 wherein the polar heteroatoms comprise at least one heteroatom selected from the group consisting of: oxygen, sulfur, and phosphorous.

* * * * *